J. W. THOMPSON AND J. T. TERRY, Jr.
SULFIDATION AND FLOTATION OF MINERALS.
APPLICATION FILED NOV. 16, 1916.
1,334,720.
Patented Mar. 23, 1920.
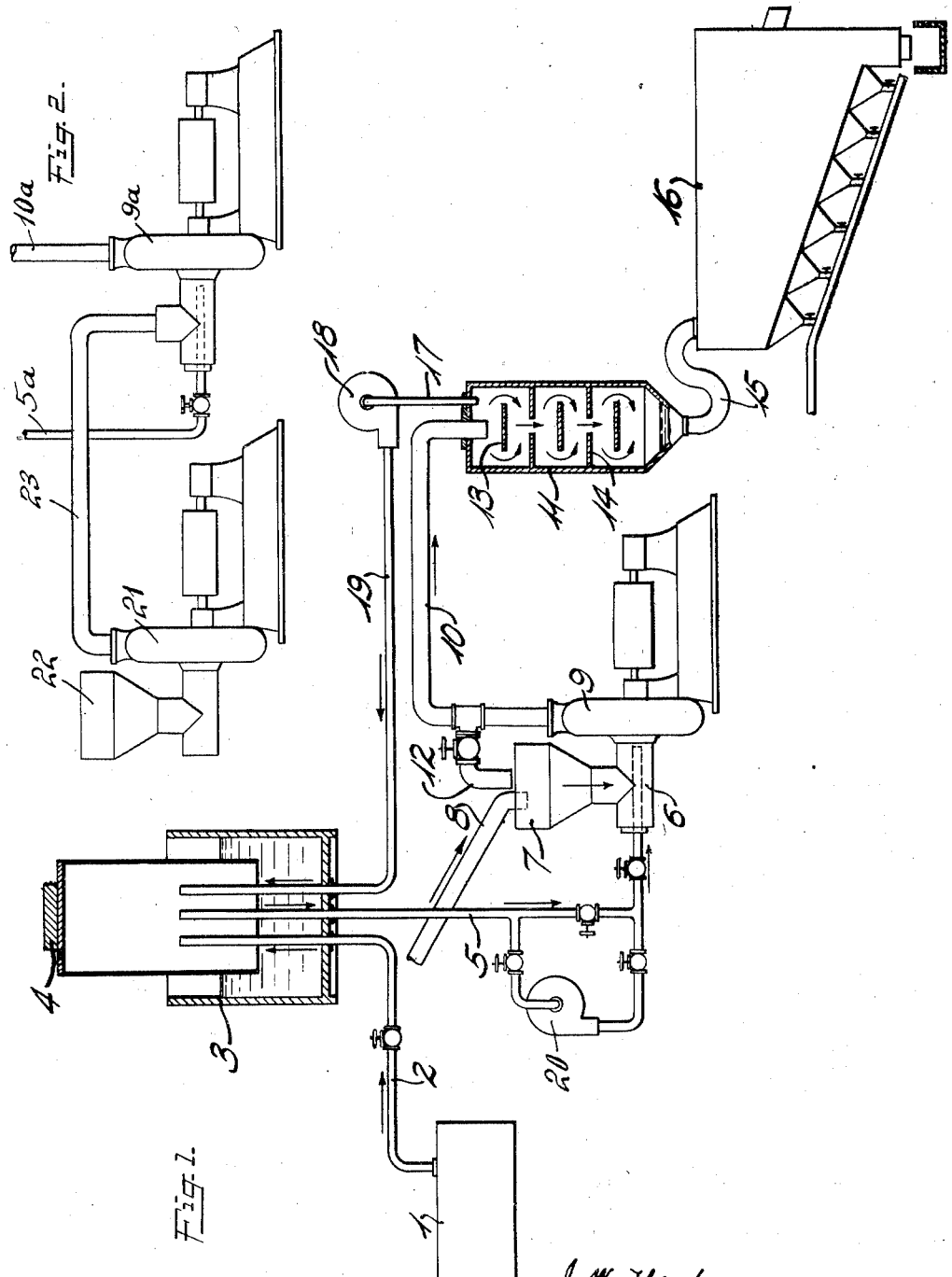

UNITED STATES PATENT OFFICE.

JOHN W. THOMPSON, OF SUPERIOR, ARIZONA, AND JOSEPH T. TERRY, JR., OF SALT LAKE CITY, UTAH, ASSIGNORS TO METALS RECOVERY COMPANY, OF NEW YORK, N. Y., A CORPORATION OF MAINE.

SULFIDATION AND FLOTATION OF MINERALS.

1,334,720.      Specification of Letters Patent.     Patented Mar. 23, 1920.

Application filed November 16, 1916. Serial No. 131,687.

*To all whom it may concern:*

Be it known that we, JOHN W. THOMPSON and JOSEPH T. TERRY, Jr., both citizens of the United States, residing, respectively, at Superior, Pinal county, State of Arizona, and Salt Lake City, county of Utah, State of Utah, have invented certain new and useful Improvements in Sulfidation and Flotation of Minerals; and we do hereby declare the following to be a full, clear, and exact description of the invention, such as will enable others skilled in the art to which it appertains to make and use the same.

The present invention relates to a method and apparatus for effecting the sulfidation and flotation of non-sulfid ores from the gangue with which they are associated, by filming the non-sulfid ores with sulfid, and then subjecting the sulfid-filmed ore to an appropriate flotation treatment for effecting the separation of the sulfidized ore from the gangue.

If the sulfidation of finely divided oxidized ores is effected in an open tank, and even if this open tank is provided with an agitator, we have found that a relatively large gas consumption is necessary for effecting a satisfactory filming of the oxid constituents with sulfid, using hydrogen sulfid as the sulfidizing agent. In an open tank, any excess hydrogen sulfid escapes into the atmosphere, contaminating the surrounding air and making it injurious to the workmen engaged in the operation of the apparatus. The hydrogen sulfid tends to rise directly to the surface and even when the contents of the open tank are agitated, it is difficult to avoid appreciable loss of the gas.

We have now found that the disadvantages and objections incident to the use of an open tank can be overcome and materially improved results secured both as to the amount of hydrogen sulfid required and as to the recovery of values from the ore, by introducing the hydrogen sulfid directly into the suction side of a centrifugal pump or its equivalent in which the gas is most intimately mixed and distributed throughout the ore pulp with resulting maximum action thereof upon the oxid constituents of the pulp.

We have furthermore found that this introduction of the hydrogen sulfid directly into the centrifugal pump and the most intimate intermingling and intermixture therein causes it to have a more selective action in that the small quantity of gas thus required for filming the oxid ores appears to have a greater preference for the oxid constituents as compared with the gangue constituents than is possible when the gas is introduced into the bottom of an open tank in the manner referred to above. By introducing the hydrogen sulfid in this way, we have been able to secure improved results with a consumption of as little as one pound or even less of sulfur (as hydrogen sulfid) per ton; whereas, with an open tank an amount of sulfur as high as six pounds and often as high as eight or ten pounds per ton is required, on the same ore. Furthermore, owing to the intimate and direct contact and action of the hydrogen sulfid when introduced into the centrifugal pump and there caused to exert its action, we have been enabled to secure much higher recoveries, these recoveries increasing in some cases from 40 or 50% to as high as 75 and 80%. There is accordingly secured a materially improved yield and higher recovery by the use of a materially decreased amount of the filming agent. The action of the hydrogen sulfid when introduced in this manner seems more particularly to act as a filming agent rather than to effect the conversion of the whole of the oxid constituents into sulfids. Inasmuch as the successful flotation of the sulfidized ore is largely or primarily a surface phenomenon due to the sulfid surface of the ore particles, it is not essential that the inside of the particles be sulfidized so long as the filming of the surface of the particles takes place. It is particularly in this filming operation that the present invention presents particular advantage and notable economy.

We have further found that the ore after it has passed through the centrifugal pump and been filmed therein can, with advantage, be subjected to a further treatment for disentangling and removing the hydrogen sulfid carried thereby which has not been absorbed or which is readily removable. The ore may thus be spread out over baffles in a disentangling tower maintained under a reduced pressure and the excess hydrogen sulfid thus removed recovered for further use.

After the ore as been filmed with sulfid in the manner described above, it is transferred to a flotation machine of any appropriate construction. For example, it may be then subjected to the action of an oil or other frothing-agent apparatus and then to flotation in a Callow tank, or other suitable flotation apparatus for recovering the sulfidized constituents from the gangue.

The invention will be described more in detail in connection with Figures 1 and 2 of the accompanying drawing illustrative thereof in which is illustrated more or less diagrammatically and partly in section an arrangement of apparatus for effecting the sulfidation and flotation of the oxidized ores.

The apparatus illustrated in Fig. 1 comprises a gas generator 1 of any suitable or prefered construction communicating by a valve-controlled pipe 2 with the gasometer 3, the pressure within which can be regulated by the weight 4. A pipe 5 leads the hydrogen sulfid gas to the inlet side 6 of a centrifugal pump 9 into which the ore pulp is fed by means of the hopper 7 and the feed pipe or trough 8. The pump 9 discharges through the pipe 10 to the disentangling tower 11 having therein baffles 13 and 14 for spreading out the ore pulp and permitting disengagement or disentangling of the unabsorbed hydrogen sulfid carried thereby. This action can be promoted by the fan or exhauster 18 arranged to create a diminished pressure within the tower 11 and communicating therewith by the pipe 17, and the gas thus recovered returned by the pipe 19 to the gasometer.

Where it is desired to return part of the pulp for further treatement, this can be done by means of the valve-controlled return pipe 12. The pulp flows from the tower 11 through the outlet pipe 15 and, after being subjected to the action of oil or other suitable frothing-agent, will pass on to the flotation cell or machine 16 which is shown conventionally as a Callow tank of known construction and operation. In this tank the ore is subjected to the flotation action of air introduced through the porous bottom of the tank in the usual manner.

The aspirating action of the centrifugal pump, when the hydrogen sulfid is introduced into the suction side of the pump in the manner above described, may be supplemented by introducing the hydrogen sulfid under pressure. We have found that such introduction of the gas under pressure materially promotes the absorption of the gases by the ore pulp and the resulting sulfidizing operation. Inasmuch as the ore pulp and the gas admitted are subjected to vigorous agitation and intimate intermixture within the pump, the introduction of the gas also under pressure, so that this pressure supplements the aspirating action of the pump, leads to increased activity and absorption of the hydrogen sulfid gas.

In order that the hydrogen sulfid gas may be supplied under pressure, it is sufficient to provide a source of supply of the gas compressed to the necessary degree or to compress the gas on its way to the pump inlet. In Fig. 1 a centrifugal compression pump is shown at 20 connected with the gas supply pipe 5 and being located in a branch or by-pass so that, by proper regulation of the valves, the gas may be introduced directly through the pipe 5 or indirectly through the by-pass and the compression pump. When the pump is used the gas can be delievered under any desired pressure.

It has been found of advantage also, in some cases, to use two centrifugal pumps and to introduce the hydrogen sulfid between the two pumps so that it is drawn into the second pump and there intermixed with the pulp to be sulfidized. A more positive injection or aspiration of the gas is thus obtained, and there is less danger from leakage of air around the compressor shaft. Such an arrangement is shown in Fig. 2 where the pump $9^a$, discharge pipe $10^a$, and hydrogen sulfid supply pipe $5^a$, correspond to similar elements of Fig. 1. A second centrifugal pump is shown at 21 provided with a feed hopper 22 and discharge pipe 23, which conveys the pulp to the inlet of the second centrifugal pump $9^a$. Thus the pulp is introduced into the second pump under an increased pressure, and its action upon the entrance of the hydrogen sulfid, and the intermixture and action of the gas and pulp, correspondingly modified.

The supply of hydrogen sulfid may be secured from any suitable source, depending upon the available sulfur-bearing materials. It may thus be produced from sulfur by combustion or it may be produced from natural sulfids or flotation concentrates such as are usually available in the vicinity of the flotation plant. It will be obvious that various methods of producing the hydrogen sulfid are available for use, and that the particular method utilized will vary in different localities and under different conditions.

Having thus described our invention what we claim is:

1. The method of effecting the sulfidation of oxidized ores preparatory to the concentration thereof by flotation, which comprises subjecting the ore to be sulfidized to the action of a plurality of combined mechanical mixers and pumps in succession and introducing hydrogen sulfid into the ore pulp at an intermediate stage and employing the pumping action of the succeeding mixer or mixers for intimately intermingling the same with the ore pulp, substantially as described.

2. An apparatus for the sulfidation of ores preparatory to the concentration thereof by flotation comprising a plurality of centrifugal pumps, means for feeding the ore pulp to the first of said pumps, and means for supplying hydrogen sulfid between said pumps whereby it is intimately intermixed with the ore pulp, substantially as described.

3. The method of effecting the sulfidation of oxidized ores preparatory to the concentration thereof by flotation, which comprises subjecting the ore to be sulfidized to the action of a plurality of pumps in succession whereby the ore pulp is discharged under pressure from one pump into the next succeeding pump, and introducing a soluble sulfid into the ore pulp current at an intermediate stage in its passage from the first to the last of said pumps thereby effecting an intimate intermingling of said soluble sulfid and the ore pulp, substantially as described.

4. The method of effecting the sulfidation of oxidized ores preparatory to the concentration thereof by flotation, which comprises subjecting the ore to be sulfidized to the action of a plurality of mechanical mixers in succession and effecting the discharge of the ore pulp under pressure from one mixer to the next succeeding mixer, and introducing a soluble sulfid into the ore pulp current at an intermediate stage in its passage from the first to the last of said mixers and employing the mixing action of the succeeding mixer or mixers for intimately intermingling said soluble sulfid with the ore pulp, substantially as described.

5. An apparatus for the sulfidation of ores preparatory to the concentration thereof by flotation comprising a plurality of pumps arranged in succession, means for conducting the ore to be sulfidized through said pumps in succession, whereby the ore pulp is discharged under pressure from one pump into the next succeeding pump, and means for supplying hydrogen sulfid to the suction side of one of said pumps intermediate the suction side of the first pump and the outlet side of the last pump whereby the ore is subjected most intimately to the action of hydrogen sulfid by the pumping action of each succeeding pump or pumps, substantially as described.

In testimony whereof, we affix our signatures.

JOHN W. THOMPSON.
JOSEPH T. TERRY, Jr.